US012620855B2

(12) United States Patent
Abe et al.

(10) Patent No.: US 12,620,855 B2
(45) Date of Patent: May 5, 2026

(54) ROTOR MANUFACTURING METHOD, AND ROTOR

(71) Applicant: HONDA MOTOR CO., LTD., Tokyo (JP)

(72) Inventors: Yuki Abe, Wako (JP); Yuki Hasegawa, Wako (JP); Masatoshi Nagashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 18/581,422

(22) Filed: Feb. 20, 2024

(65) Prior Publication Data

US 2024/0297542 A1 Sep. 5, 2024

(30) Foreign Application Priority Data

Mar. 3, 2023 (JP) ................................. 2023-032866

(51) Int. Cl.
H02K 1/28 (2006.01)
H02K 1/278 (2022.01)
H02K 15/03 (2006.01)
(52) U.S. Cl.
CPC ............... H02K 1/28 (2013.01); H02K 1/278 (2013.01); H02K 15/03 (2013.01)

(58) Field of Classification Search
CPC ........... H02K 1/28; H02K 1/278; H02K 15/03
See application file for complete search history.

(56) References Cited

FOREIGN PATENT DOCUMENTS

| | | | |
|---|---|---|---|
| JP | 2020-145895 | 9/2020 | |
| WO | WO-2021192444 A1 * | 9/2021 | ............. H02K 21/14 |

* cited by examiner

*Primary Examiner* — Terrance L Kenerly
(74) *Attorney, Agent, or Firm* — Amin, Turocy & Watson, LLP

(57) ABSTRACT

A sleeve of a rotor includes a first sleeve layer and a second sleeve layer. The first sleeve layer is arranged on the most radially inward and fitted to an outer peripheral portion of a rotor body. The second sleeve layer is arranged radially outward of the first sleeve layer and fitted thereto. In a fitting step, the outer peripheral portion of the rotor body is pressed and fitted into a first sleeve layer having a first inner diameter that is smaller than an outer diameter of the outer peripheral portion. Then, a first outer peripheral portion of the first sleeve layer fitted to the outer peripheral portion of the rotor body is pressed into a second sleeve layer having a second inner diameter that is smaller than a first outer diameter of the first sleeve layer, and fitted to the second sleeve layer.

3 Claims, 7 Drawing Sheets

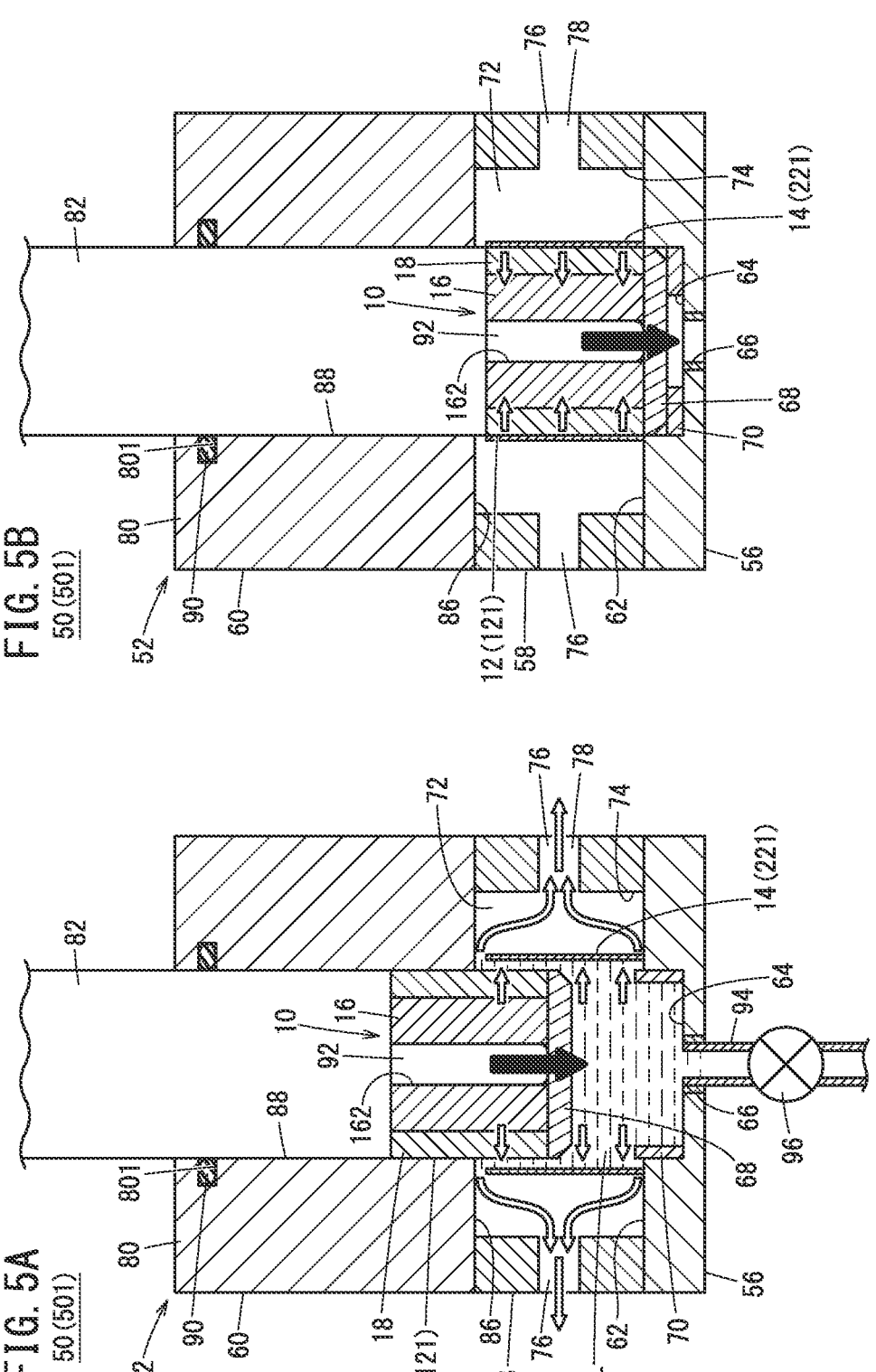

502 (50)

502 (50)

503 (50)

503 (50)

ROTOR MANUFACTURING METHOD, AND ROTOR

CROSS-REFERENCE TO RELATED APPLICATIONS

This application is based upon and claims the benefit of priority from Japanese Patent Application No. 2023-032866 filed on Mar. 3, 2023, the contents of which are incorporated herein by reference.

BACKGROUND OF THE INVENTION

Field of the Invention

The present invention relates to a rotor manufacturing method and a rotor.

Description of the Related Art

JP 7049285 B2 discloses a rotor of a rotating electric machine. The rotor is provided with permanent magnets fixed to an outer peripheral surface of a rotor core, and a cylindrical sleeve which applies a pressurizing force to the rotor core by covering an outer peripheral portion of the rotor core. The gaps between the sleeve and the magnets are filled with resin, and the resin is solidified. When the rotor rotates, the sleeve and the resin prevent the permanent magnets from moving radially outward due to centrifugal force.

SUMMARY OF THE INVENTION

In general, in a rotor as disclosed in JP 7049285 B2, it is required to prevent the movement of the permanent magnets due to the centrifugal force only by the sleeve, and it is also required to make the sleeve thinner. However, it is difficult to achieve both the satisfactory pressurizing force applied to the rotor core by the sleeve and the satisfactory thinness of the sleeve. Further, when the sleeve of the single layer structure is attached to the outer peripheral portion of the rotor core, a circumferential stress acting in the circumferential direction of the sleeve is distributed so as to become smaller from the inner peripheral side toward the outer peripheral side. Therefore, the sleeve cannot efficiently apply the pressurizing force to the outer peripheral portion of the rotor core.

According to an aspect of the present invention, a method of manufacturing a rotor is provided. The rotor includes a rotor core, a plurality of permanent magnets provided in an outer peripheral portion of the rotor core and arranged in a circumferential direction of the rotor core, and a sleeve having a cylindrical shape and surrounding an outer peripheral portion of a rotor body that includes the rotor core and the plurality of permanent magnets, the sleeve being fitted to the rotor body and configured to apply a pressurizing force directed radially inward to the plurality of permanent magnets, wherein the sleeve includes a plurality of at least two sleeve layers laminated radially, the plurality of sleeve layers includes a first sleeve layer disposed most radially inward of the sleeve and fitted to the outer peripheral portion of the rotor body, and a second sleeve layer disposed radially outward of the first sleeve layer and fitted to the first sleeve layer. The method includes a first fitting step of pressing and fitting the outer peripheral portion of the rotor body, into the first sleeve layer having a first inner diameter that is smaller than an outer diameter of the outer peripheral portion of the rotor body, and a second fitting step of pressing and fitting a first outer peripheral portion of the first sleeve layer fitted to the outer peripheral portion of the rotor body, into the second sleeve layer having a second inner diameter that is smaller than a first outer diameter of the first sleeve layer.

According to the present invention, by pressing and fitting the first sleeve layer fitted to the outer peripheral portion of the rotor body, into the second sleeve layer having the second inner diameter that is smaller than the first outer diameter of the first sleeve layer, the difference between the circumferential stress in the second sleeve layer and the circumferential stress in the first sleeve layer can be suppressed. In this way, as compared with the structure in which the pressurizing force is applied to the rotor body by the sleeve of the single layer structure, the pressurizing force applied radially inward by the second sleeve layer disposed radially outward can be efficiently increased, and therefore the thickness of the sleeve in the radial direction can be reduced. Alternatively, compared with a sleeve of a single layer structure having the same thickness, the allowable number of rotations when the rotor rotates can be improved.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is an enlarged cross-sectional view of a periphery of the sleeve in the rotor of FIG. 1;

FIG. 5A is an explanatory view of an insertion step in the first fitting step;

FIG. 5B is an explanatory view of a fixing step of the first fitting step;

DETAILED DESCRIPTION OF THE INVENTION

Figure 1:
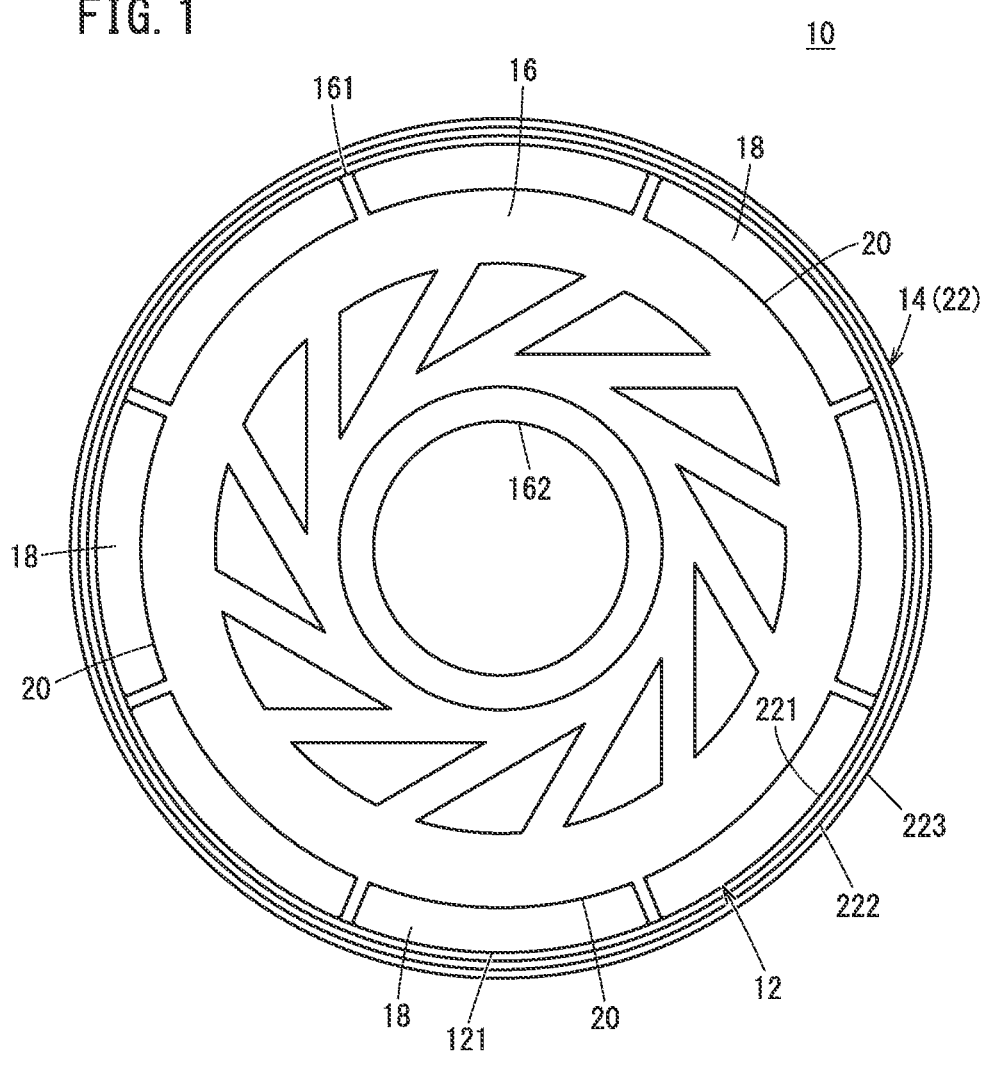
FIG. 1 is an overall plan view of a rotor according to an embodiment of the present invention.

A rotor 10 according to the present embodiment constitutes a part of a rotating electric machine having a housing and a stator. As shown in FIG. 1, the rotor 10 includes a rotor body 12 and a sleeve 14 surrounding an outer peripheral portion 121 of the rotor body 12. The rotor body 12 is provided with a rotor core 16 and a plurality of permanent magnets 18.

The rotor core 16 is formed of a magnetic material in a cylindrical shape. When viewed in an axial direction of the rotor core 16, a core outer peripheral portion 161 of the rotor core 16 is circular. The core outer peripheral portion 161 of the rotor core 16 has a plurality of accommodating portions 20. The plurality of accommodating portions 20 are arranged in the circumferential direction of the rotor body 12 and are recessed radially inward with respect to the core outer peripheral portion 161 of the rotor core 16. The plurality of accommodating portions 20 are spaced from each other at equal intervals in the circumferential direction of the rotor core 16. The center of the rotor core 16 has a through hole 162 penetrating in the axial direction. A shaft of a rotating electric machine (not shown) is fitted into the through hole 162.

The plurality of permanent magnets 18 are accommodated in the accommodating portions 20 of the rotor core 16, respectively. The plurality of permanent magnets 18 are provided in the core outer peripheral portion 161 of the rotor core 16 in the accommodating portions 20 thereof, and are arranged in the circumferential direction of the rotor core 16. A plurality of permanent magnets 18 are arranged in the circumferential direction of the rotor body 12. The plurality of permanent magnets 18 are arranged such that the polarities thereof alternate in the circumferential direction of the rotor core 16. The plurality of permanent magnets 18 are exposed to, for example, the core outer peripheral portion 161 of the rotor core 16. The plurality of permanent magnets 18 are not limited to the case where they are exposed to the outer peripheral portion 121 of the rotor core 16 and are disposed flush with the outer peripheral surface. The plurality of permanent magnets 18 may be disposed radially outward with respect to the outer peripheral surface of the rotor core 16. The plurality of permanent magnets 18 may be disposed radially inward with respect to the core outer peripheral portion 161 of the rotor core 16. The plurality of permanent magnets 18 may be formed inside the core outer peripheral portion 161 of the rotor core 16 and need not necessarily be exposed to the outer peripheral surface.

The sleeve 14 is formed of, for example, carbon fiber reinforced plastics (CFRP) in a cylindrical shape. The sleeve 14 is composed of only a hoop layer in which reinforcing fibers are wound in the circumferential direction. The sleeve 14 surrounds the outer peripheral portion 121 of the rotor body 12 including the rotor core 16 and the permanent magnets 18 and covers the outer peripheral portion 121. The sleeve 14 is fitted to the outer peripheral portion 121 of the rotor body 12 and applies a pressurizing force directed radially inward to the plurality of permanent magnets 18. When the rotor 10 rotates, the sleeve 14 prevents the permanent magnets 18 from floating from the rotor body 12 due to centrifugal force. The inner diameter of the sleeve 14 before being mounted on the outer peripheral portion 121 of the rotor body 12 is smaller than an outer diameter D (diameter) of the rotor body 12 (see FIG. 2). The sleeve 14 is not limited to the case where it is formed of carbon fiber reinforced plastics. The sleeve 14 may be formed of, for example, another fiber reinforced resin (FRP) including a glass fiber reinforced plastics (GFRP), a metal material, a resin material, or the like.

The sleeve 14 includes a plurality of sleeve layers 22 laminated in the radial direction. The plurality of sleeve layers 22 include, for example, a first sleeve layer 221 disposed on the innermost side in the radial direction, a second sleeve layer 222 disposed radially outward of the first sleeve layer 221, and a third sleeve layer 223 disposed radially outward of the second sleeve layer 222. That is, the sleeve 14 has a three-layer structure including the first to third sleeve layers 221, 222, and 223.

The sleeve 14 is not limited to the case where it includes the first to third sleeve layers 221, 222, and 223. The number of the sleeve layers 22 may be two or more. The number of the sleeve layers 22 may be four or more as long as the sleeve layers 22 are laminated in the radial direction in the outer peripheral portion 121 of the rotor body 12. The sleeve 14 is fitted to the outer peripheral portion 121 of the rotor body 12 in the order of the first sleeve layer 221, the second sleeve layer 222, and the third sleeve layer 223, from the radially inward side to the radially outward side.

Figure 2:
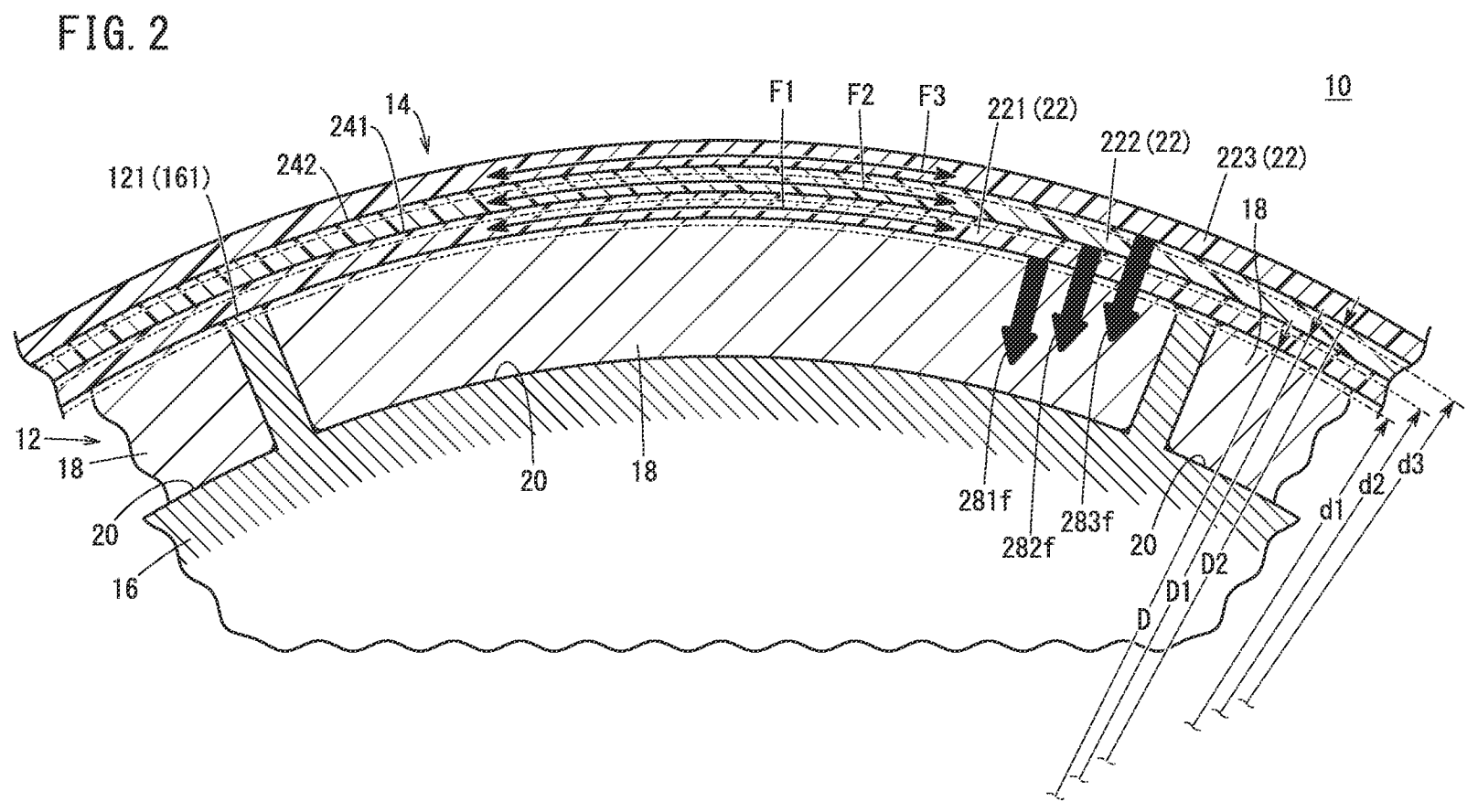

As shown in FIG. 2, the first sleeve layer 221 is formed in a cylindrical shape having a first thickness in the radial direction. The first sleeve layer 221 has a first outer peripheral portion 241 on the outer periphery thereof, and the second sleeve layer 222 is fitted to the first outer peripheral portion 241. The first sleeve layer 221 is fitted to the outer peripheral portion 121 of the rotor body 12. In a pre-fitting state before the first sleeve layer 221 is fitted to the outer peripheral portion 121 of the rotor body 12, a first inner diameter d1 of the first sleeve layer 221 is smaller than the outer diameter D (diameter) of the outer peripheral portion 121 of the rotor body 12 (d1<D). The outer peripheral portion 121 of the rotor body 12 is pressed into the first sleeve layer 221. The first sleeve layer 221 is fitted to the radially outward side of the outer peripheral portion 121 of the rotor body 12. At this time, the first sleeve layer 221 expands in the circumferential direction of the outer peripheral portion 121 of the rotor body 12. A first circumferential stress F1 (tension) is generated in the first sleeve layer 221 in the circumferential direction of the first sleeve layer 221. A first pressurizing force 281f (first tightening load) directed radially inward is generated in the first sleeve layer 221. The first pressurizing force 281f is applied radially inward from the inner surface of the first sleeve layer 221 to the outer peripheral portion 121 of the rotor body 12. The direction in which the first pressurizing force 281f is applied is a direction toward a central axis of the rotor core 16.

The second sleeve layer 222 is formed in a cylindrical shape having a second thickness in the radial direction. The outer periphery of the second sleeve layer 222 is provided with a second outer peripheral portion 242 to which the third sleeve layer 223 is fitted. In a state before the second sleeve layer 222 is fitted to the first outer peripheral portion 241 of the first sleeve layer 221 fitted to the outer peripheral portion 121 of the rotor body 12, a second inner diameter d2 of the second sleeve layer 222 is smaller than a first outer diameter D1 of the first sleeve layer 221 (the first outer peripheral portion 241) (d2<D1). The second inner diameter d2 of the second sleeve layer 222 is larger than the first inner diameter d1 of the first sleeve layer 221. The first outer peripheral portion 241 of the first sleeve layer 221 fitted to the outer peripheral portion 121 of the rotor body 12 is pressed and fitted into the second sleeve layer 222.

At this time, the second sleeve layer 222 expands in the circumferential direction of the outer peripheral portion 121 of the rotor body 12. A second circumferential stress F2 (tension) is generated in the second sleeve layer 222 in the circumferential direction of the second sleeve layer 222. A second pressurizing force 282f (second tightening load) directed radially inward from the inner surface of the second sleeve layer 222 is generated in the second sleeve layer 222. The second pressurizing force 282f is applied to the outer peripheral portion 121 of the rotor body 12 radially inward through the first sleeve layer 221. The direction in which the second pressurizing force 282f is applied is a direction toward the central axis of the rotor core 16.

The second inner diameter d2 of the second sleeve layer 222 is set such that the second circumferential stress F2 acting on the second sleeve layer 222 and the first circumferential stress F1 acting on the first sleeve layer 221 are substantially equal. For example, a ratio of the second circumferential stress F2 to the first circumferential stress F1 (F2/F1) is set to be equal to or greater than a circumferential stress generated at the same portion (same diameter portion) in the radial direction of the single-layered sleeve.

The third sleeve layer 223 is formed in a cylindrical shape having a third thickness in the radial direction. The third sleeve layer 223 is fitted to the outer peripheral portion 121 of the rotor body 12 through the first and second sleeve layers 221 and 222. In a state before the third sleeve layer 223 is fitted to the second outer peripheral portion 242 of the second sleeve layer 222 fitted to the first outer peripheral portion 241 of the first sleeve layer 221, a third inner diameter d3 of the third sleeve layer 223 is smaller than the second outer diameter D2 of the second sleeve layer 222 fitted to the rotor body 12 (d3<D2). The second outer peripheral portion 242 of the second sleeve layer 222 is pressed and fitted into the third sleeve layer 223.

At this time, the third sleeve layer 223 expands in the circumferential direction of the outer peripheral portion 121 of the rotor body 12. A third circumferential stress F3 (tension) acts on the third sleeve layer 223 in the circumferential direction of the third sleeve layer 223. A third pressurizing force 283f (third tightening load) directed radially inward is generated in the third sleeve layer 223. The third pressurizing force 283f is applied radially inward from the inner surface of the third sleeve layer 223 to the outer peripheral portion 121 of the rotor body 12, through the first and second sleeve layers 221, 222. The direction in which the third pressurizing force 283f is applied is a direction toward the central axis of the rotor core 16.

The third inner diameter d3 of the third sleeve layer 223 is set such that the third circumferential stress F3 acting on the third sleeve layer 223 and the first and second circumferential stresses F1, F2 acting on the first and second sleeve layers 221, 222 are substantially equal to each other. For example, each ratio of the third circumferential stress F3 to the first and second circumferential stresses F1, F2 (F3/F1, F3/F2) is set to be equal to or greater than a circumferential stress generated at the same portion (same diameter portion) in the radial direction of the single-layered sleeve.

Next, a description will be given of a manufacturing apparatus 50 of the rotor 10 for pressing the outer peripheral portion 121 of the rotor body 12 into the sleeve 14.

Figure 3:
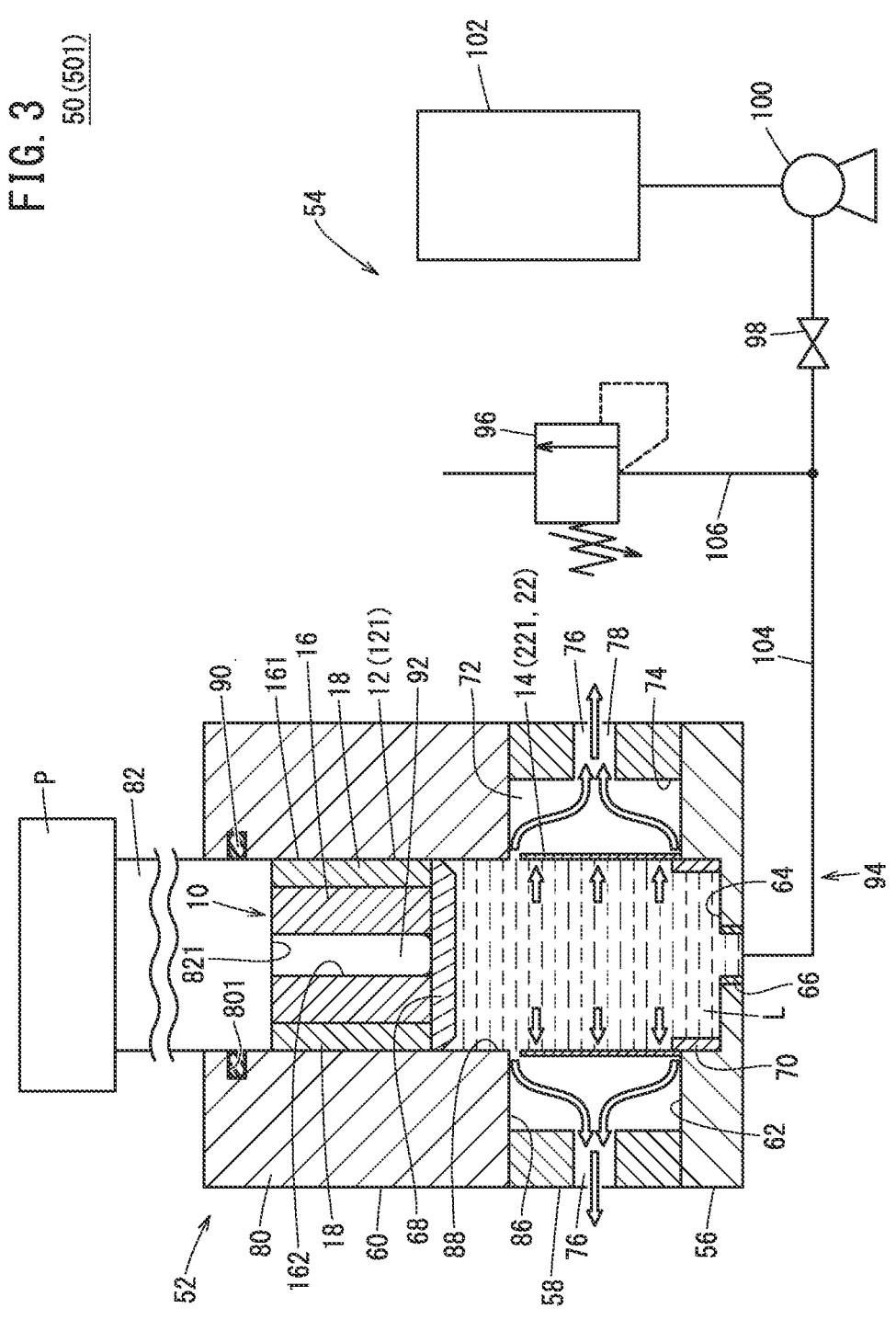
FIG. 3 is a diagram showing the overall configuration of a manufacturing apparatus for a rotor.

As shown in FIG. 3, the manufacturing apparatus 50 includes a cylinder jig 52 and a liquid supply unit 54. The cylinder jig 52 is a jig for retaining the rotor body 12 and the sleeve 14, and attaching the sleeve 14 to the outer peripheral portion 121 of the rotor body 12. The liquid supply unit 54 supplies liquid L to the cylinder jig 52.

The cylinder jig 52 includes a support block 56, a connecting portion 58, and a cylinder member 60. The support block 56 is located at a lower portion of the cylinder jig 52. The support block 56 includes a supporting surface 62 for supporting the sleeve 14, a recessed portion 64 recessed downward from the supporting surface 62, and a port portion 66 opening into the recessed portion 64.

The supporting surface 62 has a plane perpendicular to an axis of the cylinder jig 52 and abuts against the lower end portion of the sleeve 14. The supporting surface 62 supports the lower end portion of the sleeve 14 such that the lower end portion is slidable in the direction of extension of the supporting surface 62.

The recessed portion 64 is circular as viewed in plan in the axial direction of the cylinder jig 52. The recessed portion 64 has a diameter and a depth that are sufficient to accommodate a head member 68 attached to a tip of the rotor body 12. The recessed portion 64 is provided with a positioning member 70. The positioning member 70 projects toward the sleeve 14 and comes into contact with the inner peripheral surface of the sleeve 14, whereby the sleeve 14 can be positioned concentrically with the cylinder member 60.

The port portion 66 is formed in the center of the recessed portion 64 and opens to the bottom portion of the recessed portion 64. The port portion 66 is connected to the liquid supply unit 54 through a liquid flow path 94.

The connecting portion 58 is connected to an upper portion of the support block 56, and connects the support block 56 and the cylinder member 60. The connecting portion 58 has an accommodating chamber 72 for accommodating the sleeve 14 therein. The accommodating chamber 72 has an inner diameter larger than the inner diameter of the cylinder member 60 and the sleeve 14, and forms a clearance 74 around the sleeve 14 so that the sleeve 14 can be expanded. The height of the accommodating chamber 72 in the axial direction of the cylinder jig 52 is substantially the same as, for example, the height of the sleeve 14. The connecting portion 58 has a plurality of discharge ports 76 on its side portions. The discharge ports 76 each has a discharge flow path 78 extending radially through the connecting portion 58. The discharge ports 76 discharge the liquid L in the accommodating chamber 72 to the outside.

The cylinder member 60 includes a main body 80, a piston 82, and the head member 68. The main body 80 has a contact surface 86 and a cylinder hole 88. The contact surface 86 is located at a lower portion of the main body 80. The contact surface 86 is a plane perpendicular to the axis of the cylinder member 60 and abuts against an upper end of the sleeve 14. Since the inner circumferential portion of the sleeve 14 before the liquid pressure is applied has an inner diameter smaller than that of the rotor body 12, the inner circumferential portion of the sleeve 14 is located inward of the cylinder hole 88.

The upper end portion of the sleeve 14 can slide on the contact surface 86. Due to the expansion of the sleeve 14, the upper end portion of the sleeve 14 slides toward the outer periphery of the contact surface 86.

The main body 80 has the cylinder hole 88 therein. The cylinder hole 88 is a hole having a circular cross section with an inner diameter slightly larger than that of the rotor body 12, and extends through the main body 80 in the up-down direction. There is a clearance between the cylinder hole 88 and the rotor body 12. The cylinder hole 88 has a length that is sufficient to accommodate the rotor body 12 and a part of the piston 82 in the up-down direction (axial direction). The cylinder hole 88 has a receiving groove 801 recessed radially outwardly. A packing 90 is received in the receiving groove 801. The packing 90 is, for example, an O-ring and is in liquid-tight contact with the outer circumferential surface of the piston 82. The packing 90 prevents the liquid L from flowing out through a gap between the piston 82 and the cylinder hole 88.

The piston 82 is accommodated in the cylinder hole 88. The piston 82 is movable in the axial direction, for example, by a pressing device P or the like. The piston 82 moves in the up-down direction along the cylinder hole 88 while sliding in the cylinder hole 88. A lower end portion 821 of the piston 82 retains the rotor body 12. The piston 82 has a downwardly projecting supporting post 92 which positions the rotor body 12 on the central axis of the piston 82. The supporting post 92 is inserted through the through hole 162 of the rotor body 12 (rotor core 16).

The head member 68 is connected to a distal end of the supporting post 92. The head member 68 sandwiches and retains the rotor body 12 between the head member 68 and the piston 82. The head member 68 has the same diameter as the outer peripheral portion 121 of the rotor body 12. The head member 68 is disconnected from the supporting post 92 after the rotor body 12 has been inserted into the sleeve 14 (see FIG. 6B). When the connection between the head member 68 and the supporting post 92 is released, the rotor body 12 and the sleeve 14 can be detached from the piston 82.

The liquid supply unit 54 is connected to the port portion 66 via the liquid flow path 94. The liquid supply unit 54 includes a relief valve 96, a shut-off valve 98, a pump 100, and a storage tank 102. The liquid flow path 94 includes a first flow path 104 connecting the storage tank 102 and the port portion 66, and a second flow path 106 branching from the first flow path 104 and connected to the relief valve 96.

The relief valve 96 is connected to the port portion 66 via the second flow path 106 and the first flow path 104 (the liquid flow path 94). The relief valve 96 discharges the liquid L when the liquid pressure exceeds a predetermined value. The relief valve 96 keeps the liquid pressure applied to the sleeve 14, in a range equal to or less than a predetermined value.

The storage tank 102 is connected to the port portion 66 via the first flow path 104. The storage tank 102 contains the liquid L that is introduced to the inside of the sleeve 14. For example, silicone oil, grease, hydraulic oil, or the like is used as the liquid L.

The shut-off valve 98 and the pump 100 are disposed in the first flow path 104. The shut-off valve 98 is disposed in the first flow path 104 at a position that is closer to the storage tank 102 than the branch point between the first flow path 104 and the second flow path 106 is. The shut-off valve 98 closes the first flow path 104 to prevent propagation of the liquid pressure to the pump 100 and the storage tank 102.

The pump 100 is disposed between the storage tank 102 and the shut-off valve 98. The pump 100 pumps out the liquid L in the storage tank 102 to the port portion 66.

Next, a description will be given as to a method of manufacturing the rotor 10 in which the sleeve 14 is attached to the outer peripheral portion 121 of the rotor body 12 with the manufacturing apparatus 50.

First, a first fitting step is performed, for attaching the first sleeve layer 221 of constituting the innermost layer of the sleeve 14 to the outer peripheral portion 121 of the rotor body 12. The first inner diameter d1 of the first sleeve layer 221 before being fitted to the rotor body 12 is smaller than the outer diameter D of the outer peripheral portion 121 of the rotor body 12 (see FIG. 2). In the first fitting step, a first manufacturing apparatus 501 for attaching the first sleeve layer 221 is used.

Figure 4A:
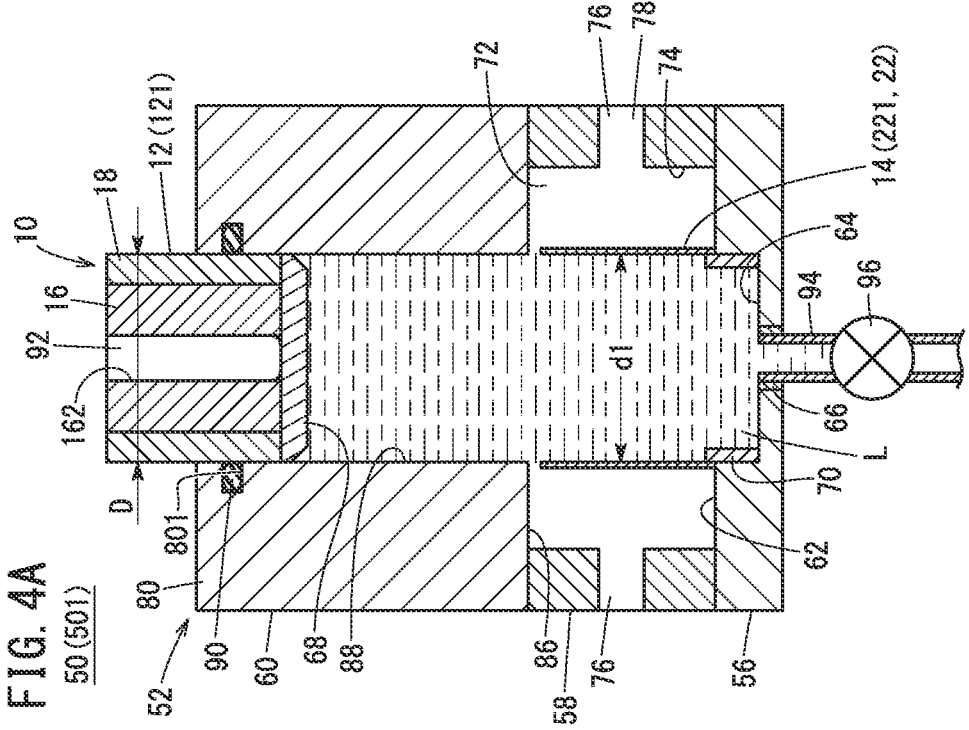
FIG. 4A is an explanatory view showing a process up to a liquid introduction step in a first fitting step of attaching a first sleeve layer in a method of manufacturing a rotor by the manufacturing apparatus for a rotor.

As shown in FIG. 4A, the first sleeve layer 221 is disposed in the accommodating chamber 72 of the first manufacturing apparatus 501. The lower end portion of the first sleeve layer 221 abuts against the supporting surface 62 of the support block 56, and the upper end portion of the first sleeve layer 221 abuts against the contact surface 86 of the main body 80 of the cylinder member 60. As a result, the first sleeve layer 221 is disposed in the axial direction of the cylinder jig 52, and the inner surface of the first sleeve layer 221 is disposed coaxially with the cylinder hole 88.

Next, in the liquid introduction step of the first fitting step, the liquid L is introduced to the inside of the first sleeve layer 221 through the port portion 66 and the recessed portion 64. The liquid L is supplied via the storage tank 102 and the pump 100 of FIG. 3. As shown in FIG. 4A, the introduction of the liquid L is continued until the cylinder hole 88 on the lower side of the head member 68 is filled with the liquid L. When the introduction of the liquid L is completed, the pump 100 of FIG. 3 is stopped, and the shut-off valve 98 closes the first flow path 104.

Figure 4B:
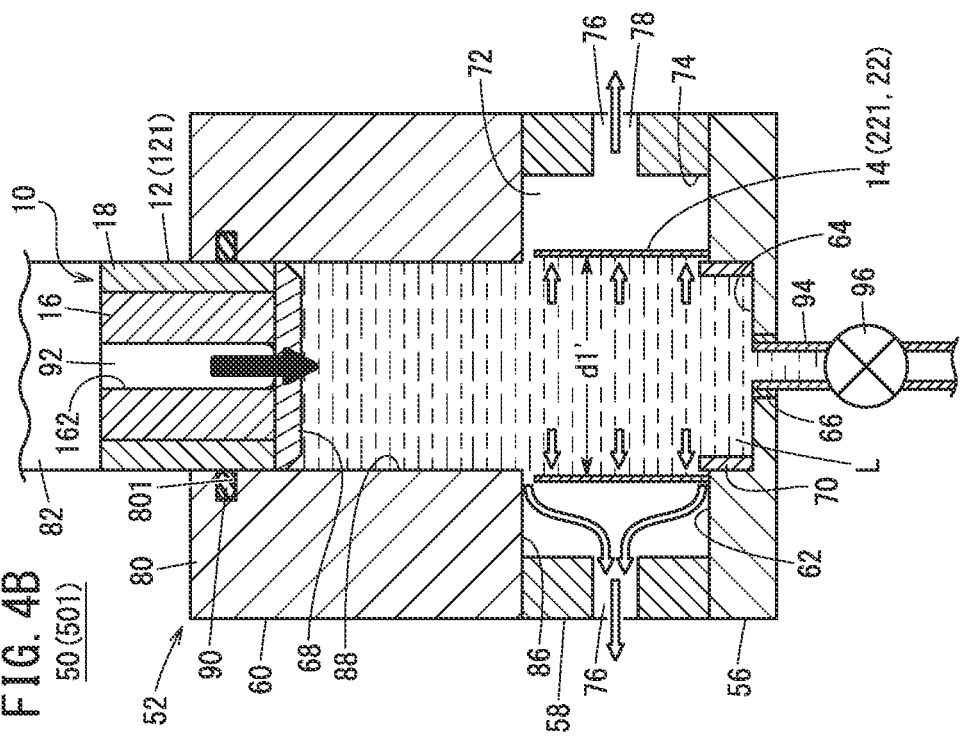
FIG. 4B is an explanatory view of an expansion step in the first fitting step.

Next, the expansion step shown in FIG. 4B is performed. In the expansion step, the piston 82 is pressed down by the pressing device P, and the liquid L is pressed down by the head member 68 as the piston 82 moves downward. The liquid L in the cylinder hole 88 flows toward the inside of the sleeve 14. This process increases the liquid pressure in the first sleeve layer 221. At this time, a part of the liquid L flows out from the clearance between the upper end portion of the first sleeve layer 221 and the cylinder member 60 (contact surface 86) and the clearance between the lower end portion of the first sleeve layer 221 and the support block 56 (supporting surface 62).

The increase in the liquid pressure inside the first sleeve layer 221 applies a predetermined liquid pressure to the first sleeve layer 221. The application of the liquid pressure pushes the first sleeve layer 221 radially outward to expand. As a result, a first inner diameter d1' of the first sleeve layer 221 becomes larger than the outer diameter D of the rotor body 12 (d1'>D).

As shown in FIG. 5A, the piston 82 is further lowered, and an insertion step is performed in which the rotor body 12 is inserted into the first sleeve layer 221. In the insertion step, since the first inner diameter d1' of the first sleeve layer 221 is larger than the outer diameter D of the rotor body 12, the rotor body 12 is inserted into the first sleeve layer 221 without contacting the first sleeve layer 221. A part of the liquid L positioned on the lower side of the head member 68 flows through the clearance 74 between the rotor body 12 and the inner peripheral surface of the sleeve 14 and flows out to the outside of the sleeve 14. At this time, the clearance 74 between the rotor body 12 and the inner surface of the first sleeve layer 221 becomes narrow, and the flow path length increases, whereby it becomes difficult for the liquid L to flow to the outside, and so that the liquid pressure inside the first sleeve layer 221 increases.

In the insertion step, when the liquid pressure inside the first sleeve layer 221 exceeds a predetermined pressure, the relief valve 96 (see FIG. 3) opens. The relief valve 96 keeps the liquid pressure inside the sleeve 14 at a predetermined value by discharging the liquid L inside the first sleeve layer 221. The relief valve 96 prevents excessive liquid pressure from occurring in the sleeve 14 to prevent damage to the first sleeve layer 221.

In the fixing step shown in FIG. 5B, when the rotor body 12 is fully inserted into the first sleeve layer 221, the head member 68 abuts against the bottom of the recessed portion 64 to stop the downward movement of the piston 82. Thereafter, the inflow of the liquid L into the first sleeve layer 221 is stopped, and the liquid pressure in the first sleeve layer 221 decreases. The decrease in the liquid pressure inside the first sleeve layer 221 eliminates the radially outward pressing force on the first sleeve layer 221, and the first sleeve layer 221 contracts radially inward. As the first sleeve layer 221 contracts radially inward, the first sleeve layer 221 is fitted and fixed to the outer peripheral portion 121 of the rotor body 12. At this time, the first sleeve layer 221 is expanded in the circumferential direction of the outer peripheral portion 121 of the rotor body 12 compared to the initial state.

As shown in FIG. 2, the first circumferential stress F1 corresponding to the difference between the first inner diameter d1 of the first sleeve layer 221 in the initial state (pre-fitting state) and the outer diameter D of the rotor body 12 is generated in the first sleeve layer 221. The first pressurizing force 281f (first tightening load) corresponding to the difference between the first inner diameter d1 of the first sleeve layer 221 and the outer diameter D of the rotor body 12 is generated radially inward in the first sleeve layer 221, and the first pressurizing force 281f is applied to the outer peripheral portion 121 of the rotor body 12. In a state where the first pressurizing force 281f is applied, the first sleeve layer 221 is fixed to the outer peripheral portion 121 of the rotor body 12. That is, the first fitting step is a liquid-pressure expansion press-in method that is capable of pressing the outer peripheral portion 121 of the rotor body 12 into the first sleeve layer 221 by expanding the first sleeve layer 221 using the liquid pressure of the liquid L.

Next, a second fitting step is performed, for attaching the second sleeve layer 222 to the first outer peripheral portion 241 of the first sleeve layer 221 fitted to the outer peripheral portion 121 of the rotor body 12. The second inner diameter d2 of the second sleeve layer 222 before being fitted to the first sleeve layer 221 is smaller than the first outer diameter D1 of the first sleeve layer 221 fitted to the rotor body 12. The second inner diameter d2 of the second sleeve layer 222 is set to be able to generate the second circumferential stress F2 substantially equal to the first circumferential stress F1 of the first sleeve layer 221.

Figures 6A, 6B:
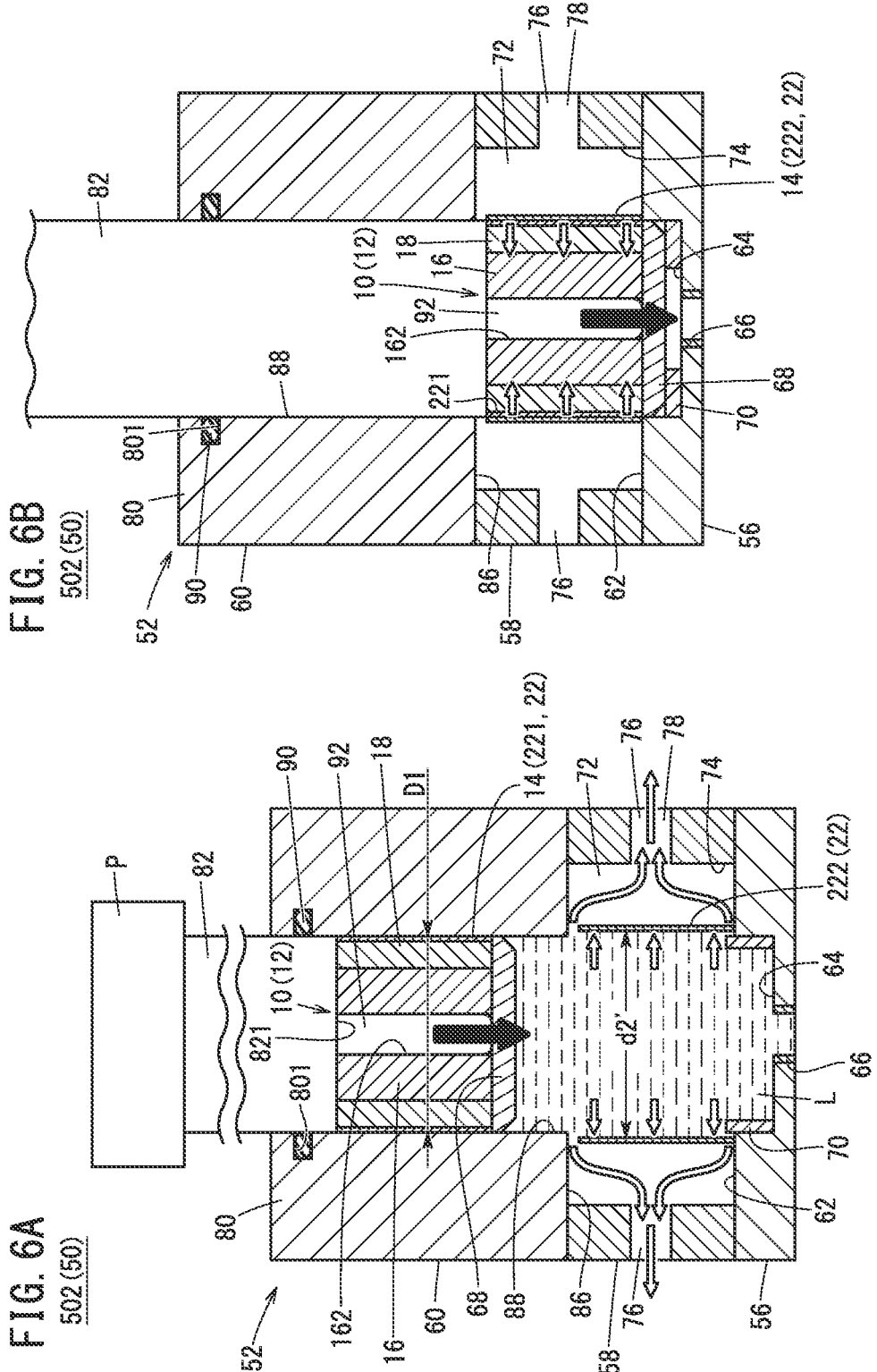
FIG. 6A is an explanatory view of a second fitting step of attaching a second sleeve layer.
FIG. 6B is an explanatory view showing a fixing step in the second fitting step.

As shown in FIG. 6A, in the second fitting step, a second manufacturing apparatus 502 for attaching the second sleeve layer 222 is used. The second manufacturing apparatus 502 includes a piston 82, a head member 68, and a cylinder hole 88 corresponding to the first outer diameter D1 of the first sleeve layer 221. That is, the piston 82, the head member 68, and the cylinder hole 88 of the second manufacturing apparatus 502 are formed with larger diameters corresponding to the first outer diameter D1 of the first sleeve layer 221 by the thickness of the first sleeve layer 221 compared to the piston 82, the head member 68, and the cylinder hole 88 of the first manufacturing apparatus 501.

First, the second sleeve layer 222 is disposed in the accommodating chamber 72 of the second manufacturing apparatus 502. The rotor body 12 to which the first sleeve layer 221 is fixed is accommodated in the cylinder hole 88 of the cylinder member 60. Thereafter, a liquid introduction step of introducing the liquid L into the second sleeve layer 222 and the cylinder hole 88 of the cylinder member 60 is performed.

Next, in an expansion step, the piston 82 is pushed downward, and the second sleeve layer 222 is expanded radially outward by applying a liquid pressure to the inside of the second sleeve layer 222. A second inner diameter d2' of the second sleeve layer 222 becomes larger than the first outer diameter D1 of the first sleeve layer 221 (d2'>D1). Thereafter, the rotor body 12 with the first sleeve layer 221 fixed thereto is inserted into the expanded second sleeve layer 222. As shown in FIG. 6B, in a fixing step, the liquid pressure is removed and the second sleeve layer 222 contracts radially inward. As the second sleeve layer 222 contracts radially inward, the first outer peripheral portion 241 of the first sleeve layer 221 is pressed and fitted into the second sleeve layer 222. At this time, the second sleeve layer 222 is expanded in the circumferential direction of the outer peripheral portion 121 of the rotor body 12 compared to the initial state.

As shown in FIG. 2, the second circumferential stress F2 corresponding to the difference between the second inner diameter d2 of the second sleeve layer 222 and the first outer diameter D1 of the first sleeve layer 221 in the initial state (pre-fitting state) is generated in the second sleeve layer 222. For example, a ratio of the second circumferential stress F2 to the first circumferential stress F1 in the first sleeve layer 221 is set to be equal to or greater than a circumferential stress generated at the same portion (same diameter portion) in the radial direction of the single-layered sleeve. The second pressurizing force 282f (second tightening load) corresponding to the difference between the second inner diameter d2 of the second sleeve layer 222 and the first outer diameter D1 of the first sleeve layer 221 is generated radially inward in the second sleeve layer 222, and the second pressurizing force 282f is applied to the outer peripheral portion 121 of the rotor body 12 via the first sleeve layer 221. In a state where the second pressurizing force 282f is applied, the second sleeve layer 222 is fixed to the first outer peripheral portion 241 of the first sleeve layer 221. That is, the second fitting step is a liquid-pressure expansion press-in method that is capable of pressing the first outer peripheral portion 241 of the first sleeve layer 221 into the second sleeve layer 222 by expanding the second sleeve layer 222 using the liquid pressure of the liquid L.

Next, a third fitting step is performed, for attaching the third sleeve layer 223 to the second outer peripheral portion 242 of the second sleeve layer 222 fitted to the outer peripheral portion 121 of the rotor body 12. The third inner diameter d3 of the third sleeve layer 223 is smaller than the second outer diameter D2 of the second sleeve layer 222 fitted to the first sleeve layer 221. The third inner diameter d3 of the third sleeve layer 223 is set to be able to generate the third circumferential stress F3 substantially equal to the first and second circumferential stresses F1, F2 in the first and second sleeve layers 221, 222.

Figures 7A, 7B:
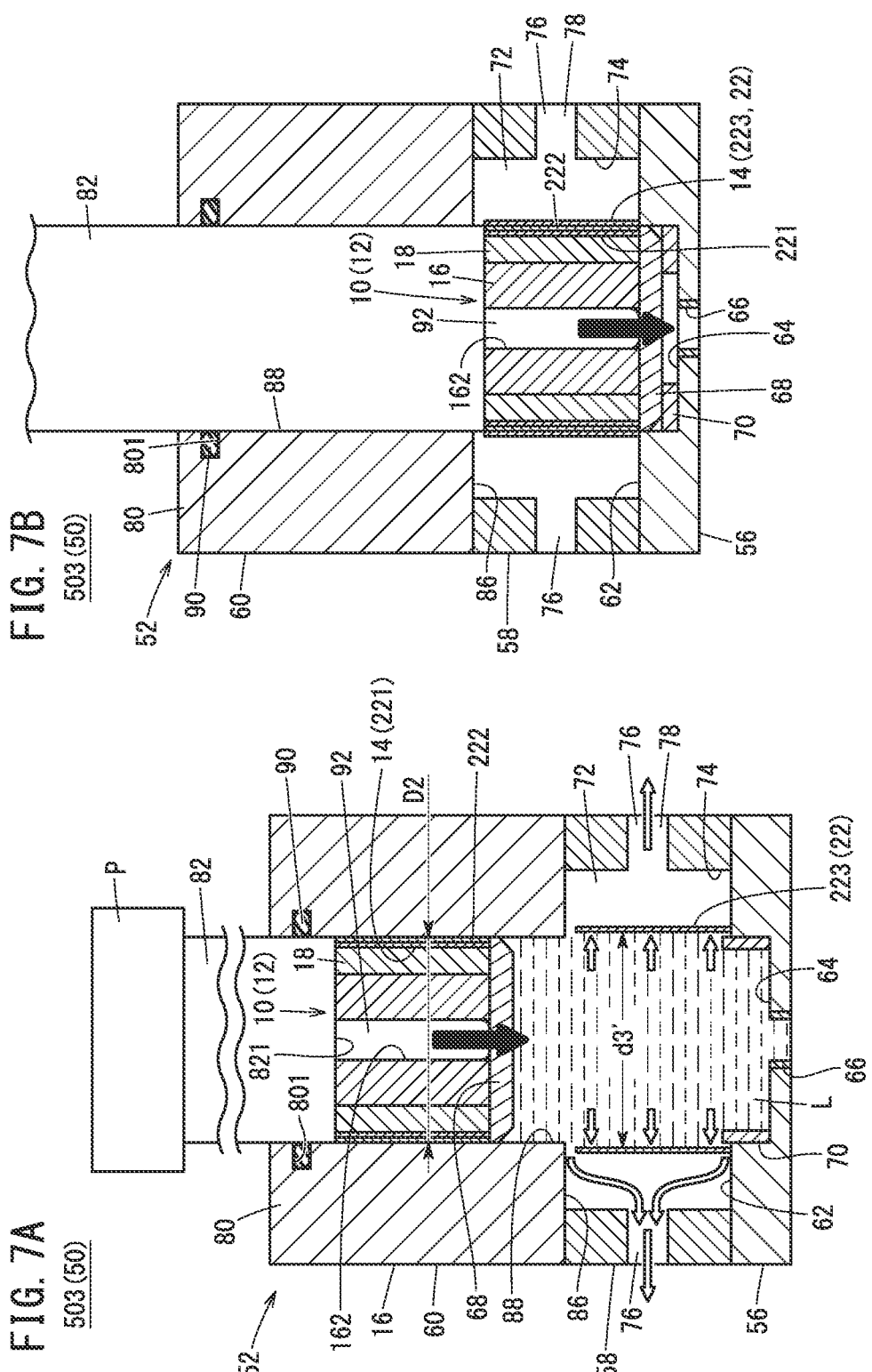
FIG. 7A is an explanatory view of a third fitting step of attaching the third sleeve layer.
FIG. 7B is an explanatory view showing a fixing step in the third fitting step.

As shown in FIG. 7A, in the third fitting step, a third manufacturing apparatus 503 for attaching the third sleeve layer 223 is used. The third manufacturing apparatus 503 includes a piston 82, a head member 68, and a cylinder hole 88 corresponding to the second outer diameter D2 of the second sleeve layer 222. That is, the piston 82, the head member 68, and the cylinder hole 88 of the third manufacturing apparatus 503 are formed with larger diameters corresponding to the second outer diameter D2 of the second sleeve layer 222 by the thickness of the second sleeve layer 222 compared to the piston 82, the head member 68, and the cylinder hole 88 of the second manufacturing apparatus 502.

First, the third sleeve layer 223 is disposed in the accommodating chamber 72 of the third manufacturing apparatus 503. The rotor body 12 to which the first and second sleeve layers 221, 222 are fixed is accommodated in the cylinder hole 88 of the cylinder member 60. Thereafter, a liquid introduction step of introducing the liquid L into the third sleeve layer 223 and the cylinder hole 88 of the cylinder member 60 is performed.

Next, in an expansion step, the piston 82 is pushed downward, and the third sleeve layer 223 is expanded radially outward by applying a liquid pressure to the inside of the third sleeve layer 223. Thereafter, the rotor body 12 with the first and second sleeve layers 221, 222 fixed thereto is inserted into the expanded third sleeve layer 223. As shown in FIG. 7B, in a fixing step, the liquid pressure is removed and the third sleeve layer 223 contracts radially inward. As the third sleeve layer 223 contracts radially inward, the second outer peripheral portion 242 of the second sleeve layer 222 is pressed and fitted into the third sleeve layer 223. At this time, the third sleeve layer 223 is expanded in the circumferential direction of the outer peripheral portion 121 of the rotor body 12 compared to the initial state.

As shown in FIG. 2, the third circumferential stress F3 corresponding to the difference between the third inner diameter d3 of the third sleeve layer 223 and the second outer diameter D2 of the second sleeve layer 222 in the initial state (pre-fitting state) is generated in the third sleeve layer 223. For example, a ratio of the third circumferential stress F3 to the first circumferential stress F1 in the first sleeve layer 221 is set to be equal to or greater than a circumferential stress generated at the same portion (same diameter portion) in the radial direction of the single-layered sleeve. The third pressurizing force 283f (third tightening load) corresponding to the difference between the third inner diameter d3 of the third sleeve layer 223 and the second outer diameter D2 of the second sleeve layer 222 is generated radially inward in the third sleeve layer 223, and the third pressurizing force 283f is applied to the outer peripheral portion 121 of the rotor body 12 via the first and second sleeve layers 221, 222. In a state where the third pressurizing force 283f is applied, the third sleeve layer 223 is fixed to the second outer peripheral portion 242 of the second sleeve layer 222. That is, the third fitting step is a liquid-pressure expansion press-in method that is capable of pressing the second outer peripheral portion 242 of the second sleeve layer 222 into the third sleeve layer 223 by expanding the third sleeve layer 223 using the liquid pressure of the liquid L.

By the above-described manufacturing process of the rotor 10, the first to third sleeve layers 221, 222, and 223 are sequentially laminated in the radial direction on the outer peripheral portion 121 of the rotor body 12, and the mounting is completed.

According to the present embodiment, the following advantageous effects are obtained.

As shown in FIG. 1, the rotor 10 has the sleeve 14 having a cylindrical shape and surrounding the outer peripheral portion 121 of the rotor body 12 that includes the rotor core 16 and the plurality of permanent magnets 18. The sleeve 14 is fitted to the rotor body 12 and configured to apply a pressurizing force directed radially inward to the plurality of permanent magnets 18. The sleeve 14 includes the plurality of at least two sleeve layers 22 laminated radially. The plurality of sleeve layers 22 includes the first sleeve layer 221 disposed most radially inward of the sleeve 14 and fitted to the outer peripheral portion 121 of the rotor body 12, and the second sleeve layer 222 disposed radially outward of the first sleeve layer 221 and fitted to the first sleeve layer 221. The method of manufacturing the rotor 10 includes the first fitting step of pressing and fitting the outer peripheral portion 121 of the rotor body 12, into the first sleeve layer 221 having the first inner diameter d1 that is smaller than the outer diameter D of the outer peripheral portion 121 of the rotor body 12, and the second fitting step of pressing and fitting the first outer peripheral portion 241 of the first sleeve layer 221 fitted to the outer peripheral portion 121 of the rotor body 12, into the second sleeve layer 222 having the second inner diameter d2 that is smaller than the first outer diameter D1 of the first sleeve layer 221.

According to this manufacturing method, by fitting the first sleeve layer 221 fitted to the outer peripheral portion 121 of the rotor body 12, into the second sleeve layer 222 having the second inner diameter d2 that is smaller than the first outer diameter D1 of the first sleeve layer 221, the difference between the second circumferential stress F2

(tension) in the second sleeve layer 222 and the first circumferential stress F1 (tension) in the first sleeve layer 221 can be suppressed. In other words, the circumferential stress in the radial direction in the sleeve 14 can be leveled. In this way, as compared with the structure in which the pressurizing force is applied to the rotor body by the sleeve of the single layer structure, the second pressurizing force 282f applied radially inward by the second sleeve layer 222 disposed radially outward can be efficiently increased, and therefore the thickness of the sleeve 14 in the radial direction can be reduced. Alternatively, when compared with a sleeve of a single layer structure having the same thickness, the allowable number of rotations when the rotor 10 rotates can be improved. In other words, the rotor 10 can be rotated at a higher speed than a rotor having the single-layered sleeve. In this case, the thickness of the sleeve 14 is a total of the thickness of the first sleeve layer 221, the thickness of the second sleeve layer 222, and the thickness of the third sleeve layer 223.

Accordingly, by leveling the first circumferential stress F1 in the first sleeve layer 221 and the second circumferential stress F2 in the second sleeve layer 222, it is possible to apply a substantially uniform pressurizing force to the outer peripheral portion 121 of the rotor body 12 by the first and second sleeve layers 221 and 222.

The plurality of sleeve layers 22 include the third sleeve layer 223 disposed radially outward of the second sleeve layer 222 and fitted to the second outer peripheral portion 242 of the second sleeve layer 222, and the manufacturing method includes the third fitting step of pressing and fitting the second outer peripheral portion 242 of the second sleeve layer 222 fitted to the first sleeve layer 221, into the third sleeve layer 223 having the third inner diameter d3 that is smaller than the second outer diameter D2 of the second sleeve layer 222.

In accordance with such features, the third circumferential stress F3 (tension) of the third sleeve layer 223 disposed radially outward of the second sleeve layer 222 can be effectively increased. The first to third sleeve layers 221, 222, and 223 further level the circumferential stresses in the sleeve 14.

Since the plurality of sleeve layers (22) are formed of a carbon fiber reinforced material (such as CFRP), by fitting the plurality of sleeve layers 22 to the outer peripheral portion 121 of the rotor body 12, the circumferential stress in each of the sleeve layers 22 is generated, and a pressurizing force directed radially inward can be effectively generated.

As shown in FIG. 1, the rotor 10 includes the sleeve 14 having a cylindrical shape and surrounding the outer peripheral portion 121 of the rotor body 12 that includes the rotor core 16 and the plurality of permanent magnets 18. The sleeve 14 is fitted to the rotor body 12 and configured to apply a pressurizing force directed radially inward to the plurality of permanent magnets 18. The sleeve 14 includes the plurality of at least two sleeve layers 22 laminated radially. The plurality of sleeve layers 22 includes the first sleeve layer 221 disposed most radially inward of the sleeve 14 and fitted to the outer peripheral portion 121 of the rotor body 12, and the second sleeve layer 222 disposed radially outward of the first sleeve layer 221 and fitted to the first sleeve layer 221.

According to this configuration, by fitting the first sleeve layer 221 and the second sleeve layer 222 positioned radially outward of the first sleeve layer 221, to the outer peripheral portion 121 of the rotor body 12 in sequence, the difference between the second circumferential stress F2 in the second sleeve layer 222 and the first circumferential stress F1 in the first sleeve layer 221 can be suppressed and leveled. In accordance with this feature, as compared with the structure in which the pressurizing force is applied to the rotor body by a sleeve of the single layer structure, the pressurizing force by the second sleeve layer 222 disposed radially outward can be efficiently increased, and therefore the thickness of the sleeve 14 can be reduced. Alternatively, compared with a sleeve of a single layer structure having the same thickness, the allowable number of rotations when the rotor 10 rotates can be improved.

The above-described embodiments are summarized as follows.

According to the above embodiment, the method of manufacturing the rotor (10) is provided. The rotor includes the rotor core (16), the plurality of permanent magnets (18) provided in the outer peripheral portion (121) of the rotor core and arranged in the circumferential direction of the rotor core, and the sleeve (14) having a cylindrical shape and surrounding the outer peripheral portion of the rotor body (12) that includes the rotor core and the plurality of permanent magnets, the sleeve being fitted to the rotor body and configured to apply the pressurizing force directed radially inward to the plurality of permanent magnets, wherein the sleeve includes the plurality of at least two sleeve layers (22) laminated radially, the plurality of sleeve layers includes the first sleeve layer (221) disposed most radially inward of the sleeve and fitted to the outer peripheral portion of the rotor body, and the second sleeve layer (222) disposed radially outward of the first sleeve layer and fitted to the first sleeve layer. The method includes the first fitting step of pressing and fitting the outer peripheral portion of the rotor body, into the first sleeve layer having the first inner diameter (d1) that is smaller than an outer diameter (D) of the outer peripheral portion of the rotor body, and the second fitting step of pressing and fitting the first outer peripheral portion (241) of the first sleeve layer fitted to the outer peripheral portion of the rotor body, into the second sleeve layer having the second inner diameter (d2) that is smaller than the first outer diameter (D1) of the first sleeve layer.

According to this manufacturing method, by pressing and fitting the first sleeve layer fitted to the outer peripheral portion of the rotor body, into the second sleeve layer having the second inner diameter that is smaller than the first outer diameter of the first sleeve layer, the difference between the circumferential stress (tension) in the second sleeve layer and the circumferential stress (tension) in the first sleeve layer can be suppressed. In this way, as compared with the structure in which the pressurizing force is applied to the rotor body by the sleeve of the single layer structure, the pressurizing force applied radially inward by the second sleeve layer disposed radially outward can be efficiently increased, and therefore the thickness of the sleeve in the radial direction can be reduced. Alternatively, compared with a sleeve of a single layer structure having the same thickness, the allowable number of rotations when the rotor rotates can be improved.

According to this manufacturing method, by leveling the first circumferential stress in the first sleeve layer and the second circumferential stress in the second sleeve layer, it is possible to apply a substantially uniform pressurizing force to the outer peripheral portion of the rotor body by the first and second sleeve layers.

The plurality of sleeve layers may include the third sleeve layer (223) disposed radially outward of the second sleeve layer and fitted to the second outer peripheral portion (242) of the second sleeve layer, and the method may further include the third fitting step of pressing and fitting the second outer peripheral portion of the second sleeve layer fitted to the first sleeve layer, into the third sleeve layer having the third inner diameter (d3) that is smaller than the second outer diameter (D2) of the second sleeve layer.

According to this manufacturing method, the third circumferential stress (tension) of the third sleeve layer disposed radially outward of the second sleeve layer can be effectively increased. The first to third sleeve layers further level the circumferential stresses in the sleeve.

The plurality of sleeve layers may be formed of a carbon fiber reinforced material (CFRP).

According to this manufacturing method, by fitting the plurality of sleeve layers to the outer peripheral portion of the rotor body, the circumferential stress in each of the sleeve layers is generated, and a pressurizing force directed radially inward can be effectively generated.

The rotor includes the rotor core, the plurality of permanent magnets provided in the outer peripheral portion of the rotor core and arranged in the circumferential direction of the rotor core, and the sleeve having the cylindrical shape and surrounding the outer peripheral portion of the rotor body that includes the rotor core and the plurality of permanent magnets, the sleeve being fitted to the rotor body and configured to apply the pressurizing force directed radially inward to the plurality of permanent magnets, wherein the sleeve includes the plurality of at least two sleeve layers laminated radially, and the plurality of sleeve layers includes the first sleeve layer disposed most radially inward of the sleeve and fitted to the outer peripheral portion of the rotor body, and the second sleeve layer disposed radially outward of the first sleeve layer and fitted to the first sleeve layer.

According to this configuration, by fitting the first sleeve layer and the second sleeve layer positioned radially outward of the first sleeve layer, to the outer peripheral portion of the rotor body in sequence, the difference between the circumferential stress in the second sleeve layer and the circumferential stress in the first sleeve layer can be suppressed and leveled. In accordance with this feature, as compared with the structure in which the pressurizing force is applied to the rotor body by a sleeve of the single layer structure, the pressurizing force by the second sleeve layer disposed radially outward can be efficiently increased, and therefore the thickness of the sleeve can be reduced. Alternatively, compared with a sleeve of a single layer structure having the same thickness, the allowable number of rotations when the rotor rotates can be improved.

According to this configuration, by leveling the first circumferential stress in the first sleeve layer and the second circumferential stress in the second sleeve layer, it is possible to apply a substantially uniform pressurizing force to the outer peripheral portion of the rotor body by the first and second sleeve layers.

Moreover, the present invention is not limited to the above-described disclosure, and various configurations can be adopted therein without departing from the essence and gist of the present invention.

What is claimed is:

1. A method of manufacturing a rotor, the rotor including:
   a rotor core;
   a plurality of permanent magnets provided in an outer peripheral portion of the rotor core and arranged in a circumferential direction of the rotor core; and
   a sleeve having a cylindrical shape and surrounding an outer peripheral portion of a rotor body that includes the rotor core and the plurality of permanent magnets, the sleeve being fitted to the rotor body and configured to apply a pressurizing force directed radially inward to the plurality of permanent magnets, wherein the sleeve includes a plurality of at least two sleeve layers laminated radially, the plurality of sleeve layers includes:

a first sleeve layer disposed most radially inward of the sleeve and fitted to the outer peripheral portion of the rotor body; and a second sleeve layer disposed radially outward of the first sleeve layer and fitted to the first sleeve layer, the method comprising:

pressing and fitting the outer peripheral portion of the rotor body, into the first sleeve layer having a first inner diameter that is smaller than an outer diameter of the outer peripheral portion of the rotor body; and pressing and fitting a first outer peripheral portion of the first sleeve layer fitted to the outer peripheral portion of the rotor body, into the second sleeve layer having a second inner diameter that is smaller than a first outer diameter of the first sleeve layer.

2. The method of manufacturing the rotor according to claim 1, wherein the plurality of sleeve layers include a third sleeve layer disposed radially outward of the second sleeve layer and fitted to a second outer peripheral portion of the second sleeve layer, and the method further comprises pressing and fitting the second outer peripheral portion of the second sleeve layer fitted to the first sleeve layer, into the third sleeve layer having a third inner diameter that is smaller than a second outer diameter of the second sleeve layer.

3. The method of manufacturing the rotor according to claim 1, wherein the plurality of sleeve layers are formed of a carbon fiber reinforced material.

* * * * *